US012769107B2

(12) United States Patent
Zhao et al.

(10) Patent No.: US 12,769,107 B2
(45) Date of Patent: Oct. 20, 2026

(54) SPECIMEN BASE, A SPECIMEN SECTIONING DEVICE, A MICROSCOPIC APPARATUS AND USE THEREOF

(71) Applicant: CHINESE INSTITUTE FOR BRAIN RESEARCH, BEIJING, Beijing (CN)

(72) Inventors: Hu Zhao, Beijing (CN); Woo-Ping Ge, Beijing (CN); Yating Yi, Beijing (CN)

(73) Assignee: Chinese Institute for Brain Research, Beijing, Beijing (CN)

( * ) Notice: Subject to any disclaimer, the term of this patent is extended or adjusted under 35 U.S.C. 154(b) by 292 days.

(21) Appl. No.: 18/709,442

(22) PCT Filed: Nov. 2, 2022

(86) PCT No.: PCT/CN2022/129332
§ 371 (c)(1),
(2) Date: May 10, 2024

(87) PCT Pub. No.: WO2023/083081
PCT Pub. Date: May 19, 2023

(65) Prior Publication Data

US 2025/0035905 A1 Jan. 30, 2025

(30) Foreign Application Priority Data

Nov. 11, 2021 (WO) ................ PCT/CN2021/103170

(51) Int. Cl.
*G02B 21/26* (2006.01)
*G01N 1/06* (2006.01)
(Continued)

(52) U.S. Cl.
CPC ............... *G02B 21/26* (2013.01); *G01N 1/06* (2013.01); *G02B 21/34* (2013.01); *G02B 30/52* (2020.01)

(58) Field of Classification Search
CPC ........ G02B 21/26; G02B 21/34; G02B 21/36; G02B 21/362; G02B 21/365;
(Continued)

(56) References Cited

U.S. PATENT DOCUMENTS

2013/0315802 A1* 11/2013 Manian ................. B01L 3/5027 422/563
2018/0361382 A1* 12/2018 Zobi ....................... B01L 9/527

FOREIGN PATENT DOCUMENTS

CN 204831879 U 12/2015
CN 211014034 U 7/2020
(Continued)

OTHER PUBLICATIONS

Tokuhisa, JP 2004198347, English language machine translation, originally published Jul. 15, 2004, English translation generated Apr. 14, 2026 (Year: 2004).*
(Continued)

*Primary Examiner* — Stephone B Allen
*Assistant Examiner* — Adam W Booher
(74) *Attorney, Agent, or Firm* — Travis Young; Bozicevic, Field & Francis LLP

(57) ABSTRACT

A specimen base, a specimen sectioning device, a microscopic apparatus and a method for 3D imaging of biological specimen. The specimen base comprising a top plate (1) and a bottom plate (2) that are detachably coupled together; the top plate (1) comprises a first plane (11) and a second plane (12) opposite each other, the first plane (11) is used for fixing specimen, and the second plane (12) is coupled with a third plane (21) of the bottom plate (2); a top plate fixing part (13) is provided on the second plane (12) and a bottom plate fixing part (22) is provided at the corresponding position on the third plane (21); the top plate (1) couples with the bottom plate (2) by means of matching the top plate fixing part (13)
(Continued)

with the bottom plate fixing part (22); a through-hole (23) is provided in the bottom plate (2).

5 Claims, 6 Drawing Sheets

(51) Int. Cl.
*G02B 21/34* (2006.01)
*G02B 30/52* (2020.01)

(58) Field of Classification Search
CPC ...... G02B 21/367; G02B 21/24; G02B 30/52; G02B 30/50; G01N 1/06; G01N 2001/002
See application file for complete search history.

(56) References Cited

FOREIGN PATENT DOCUMENTS

| | | | |
|---|---|---|---|
| CN | 112146966 | A | 12/2020 |
| JP | 2000258313 | A | 9/2000 |
| JP | 2004198347 | A | 7/2004 |
| JP | 2016100316 | A | 11/2014 |

OTHER PUBLICATIONS

Liao et al., CN 112146966, English language machine translation, originally published Dec. 29, 2020, English translation generated Apr. 14, 2026 (Year: 2020).*

* cited by examiner

SPECIMEN BASE, A SPECIMEN SECTIONING DEVICE, A MICROSCOPIC APPARATUS AND USE THEREOF

TECHNICAL FIELD

The present invention relates to a specimen base for fixing biological specimen, a specimen sectioning device, a microscopic apparatus and a method for 3D imaging of biological specimen.

BACKGROUND

Mammalian neurons give rise to extensive axons which may travel a very long distance to convey information across different areas. Mapping neural connectivity at single axon level is crucial for understanding the neuron properties and the routing of information flow. Sensory neurons are the central components of somatosensory system. Somas of sensory neurons reside in the dorsal root ganglion (DRG) and trigeminal ganglia. They extend one axonal branch to the skin and connect with sensory endings to perceive external stimuli (Zimmerman et al., 2014) and another axonal branch to the spinal cord or the brainstem to convey the information to the central nervous system (Abraira and Ginty, 2013).

Most neural connectome research has been focused on brain. Various strategies have been designed to image and map axon connectivity in brain at single axon level (Economo et al., 2016; Gong et al., 2016; Li et al., 2010; Zeng, 2018; Zheng et al., 2013). Connection and projection mapping of peripheral nervous system were much less studied. Connectivity mapping of single sensory neurons in peripheral organs or spinal cord at high resolution has never been achieved in rodent model (Kuehn et al., 2019). Unlike brain, sensory axons travel a very long distance across complex tissue types including skin, muscle, fat and even bone etc., which made the high-resolution imaging or tracing very difficult. Thick histological sections or flat-mounted sample remained to be the only available approaches for investigating the peripheral or central projections of sensory neurons, which provided limited spatial information (Browne et al., 2020; Kuehn et al., 2019; Olson et al., 2016; Woodbury et al., 2001).

Tissue clearing has been a major technical breakthrough for microscopic imaging. By treating biological samples with various chemicals, tissue could be turned into transparent. Current clearing methods can be largely divided into three major categories including aqueous methods, solvent based methods and hydrogel-based methods (Tainaka et al., 2016). Most tissue clearing methods followed similar chemical principles and were comprised of steps including fixation, decalcification (for hard tissue), decolorization, delipidation, dehydration (for solvent based clearing methods only) and RI matching (Tainaka et al., 2016). Tissue clearing technique provides a powerful approach for optical imaging deep within biological specimens. Tissue clearing have also been employed to investigate peripheral nerves travelling long range within mouse body (Cai et al., 2019). In combination with nanobody staining and light sheet microscope, single axon resolution was achieved in some regions including the skin and the muscles surfaces (Cai et al., 2019).

To achieve isotropic high resolution throughout the entire sample is the major challenge for all current tissue-clearing based imaging. Even in cleared organs, when the optical path is long, aberration still builds up due to accumulated refractive index (RI) mismatch alone the long optical path and leads to resolution deterioration (Ueda et al., 2020). Optical aberration in peripheral organs and tissue is even more severe than in the brain due to varied tissue components. Another technical barrier is the microscope objective. Image resolution is physically determined by the numeric aperture (NA) number of the objective. A high NA objective always has a very short working distance, which limited its image depth within the tissue (Chen et al., 2020; Gao, 2015).

SUMMARY OF THE INVENTION

The present invention relates to a specimen base, a specimen sectioning device, a microscopic apparatus and a method for 3D imaging of biological specimen.

In the first place, the present invention relates to a specimen base, comprising a top plate and a bottom plate that are detachably coupled together. The top plate comprises a first plane and a second plane opposite each other. The first plane is used for fixing specimen, and the second plane is coupled with a third plane of the bottom plate. A top plate fixing part is provided on the second plane and a bottom plate fixing part is provided at the corresponding position on the third plane. The top plate couples with the bottom plate by means of matching the top plate fixing part with the bottom plate fixing part. A through-hole is provided in the bottom plate.

Alternatively, a positioning part is provided on the second plane, and a positioning slot is provided at the corresponding position on the third plane, and matches with the positioning part.

Alternatively, a mark line is set on the side walls of both the top plate and the bottom plate.

Alternatively, the top plate fixing part and the bottom plate fixing part are made of magnetic material.

In the second place, the present invention relates to a specimen sectioning device, comprising a microtome and a bottom plate as mentioned above, the bottom plate is fixed on a mounting base, and the mounting base is fixed on a specimen clamp of the microtome.

In the third place, the present invention relates to a microscopic apparatus, comprising a microscope and a bottom plate as mentioned above, which is provided on a sample platform of the microscope.

Alternatively, an angle adjusting stage is provided between the sample platform and the bottom plate to adjust the angle of the bottom plane.

In the fourth place, the present invention relates to a method for 3D imaging of a biological specimen, using the top plate, the sectioning device, and the microscopic apparatus as mentioned above, comprising the following steps:

S1. fixing a biological specimen on the first plane of the top plate of the specimen base.

S2. coupling the top plate to the bottom plate provided on the specimen sectioning device, and sectioning the biological specimen.

S3. removing the top plate from the bottom plate provided on the specimen sectioning device and coupling it with the bottom plate provided on the sample platform of the microscope.

S4. observing the section of the biological specimen through the microscope and recording the result of the observation.

S5. removing the top plate from the bottom plate provided on the sample platform.

S6. repeating steps S2 to S5 until completing the observation and recording of sections of the biological specimen.

S7. combining the observation results of the section of the biological specimen and performing 3D imaging of the biological specimen.

The professional image processing softwares may be used for stitching imaging tiles, for example, BigStitcher module within the Image J. Specific overlapping is set up for adjacent tiles. Image stacks before and after samples sectioning/milling are sequentially stitched based on the overlapping regions. For two consecutive stacks, to facilitate speed, only images sequence in the overlapping zone were selected. Pairwise stitching module of the Image J was run to stitch these selected images together.

Alternatively, before step S3, the angle adjusting stage is provided between the sample platform and the bottom plate provided on the sample platform.

Alternatively, before step S4, the angle of the specimen base relative to the sample stage is adjusted by the angle adjustment stage.

With the specimen base, the specimen sectioning device and the microscopic apparatus, we can achieve sub-micron resolution in large samples composed of various tissue types and obtain 3D imaging of biological specimen quickly.

LEGEND

Figure 1:
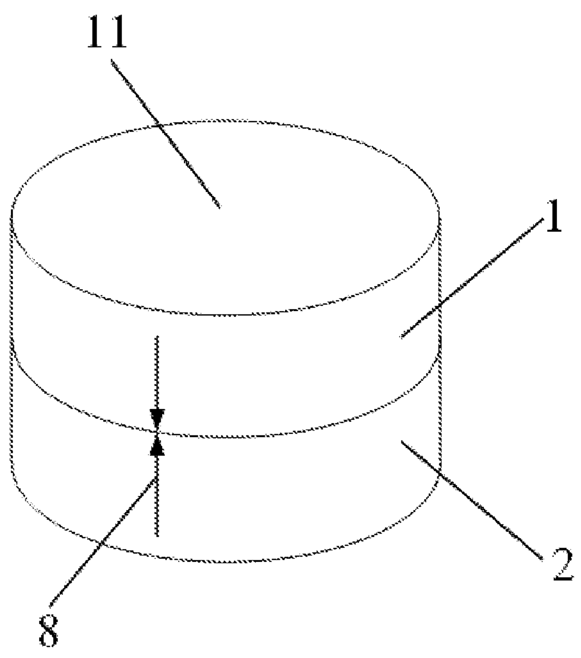
FIG. 1 illustrates a perspective view of an embodiment of a specimen base.

1. Top plate
11. First plane
12. Second plane
13. Top plate fixing part
14. Positioning part
2. Bottom plate
21. Third plane
22. Bottom plate fixing part
23. Through-hole
24. Positioning slot
25. Rod
3. Mounting base
4. Specimen clamp
5. Angle adjusting stage
6. Sample platform
7. Microscope
8. Mark line

DETAILED DESCRIPTION

In the following description, numerous specific details are set forth. However, it is understood that embodiments of the invention may be practiced without these specific details. In other instances, well-known mechanical components, circuits, structures and techniques have not been shown in detail in order not to obscure the understanding of this description. The descriptions of particular embodiments and examples are provided by way of illustration and not by way of limitation. Those skilled in the art will readily recognize a variety of noncritical parameters that could be changed or modified to yield essentially similar results.

Figure 2:
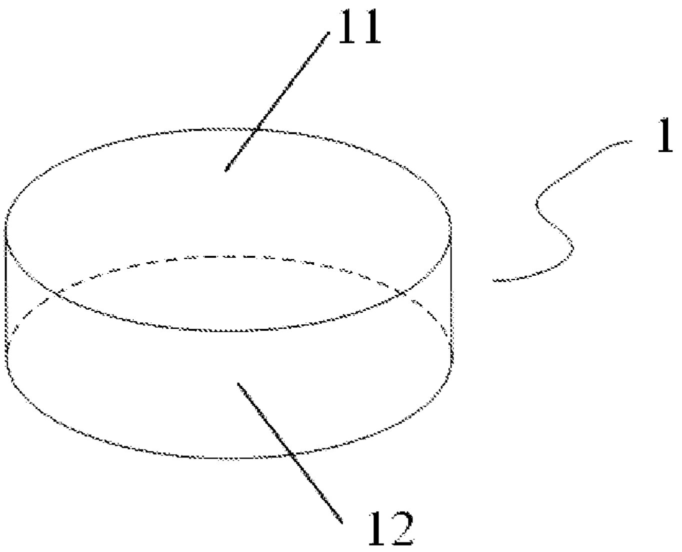
FIG. 2 illustrates a perspective view of an embodiment of top plate.
Figure 3:
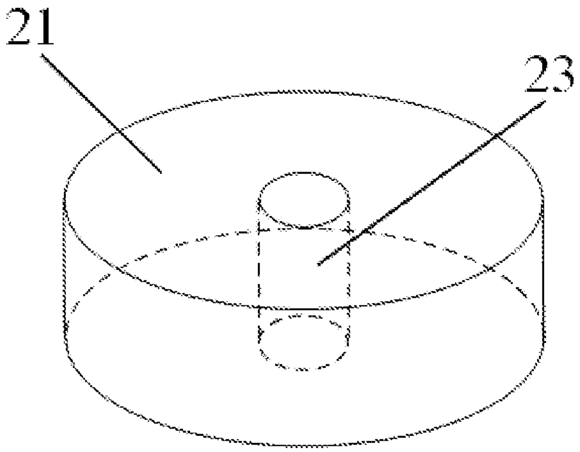
FIG. 3 illustrates a perspective view of an embodiment of bottom plate.
Figure 3A:
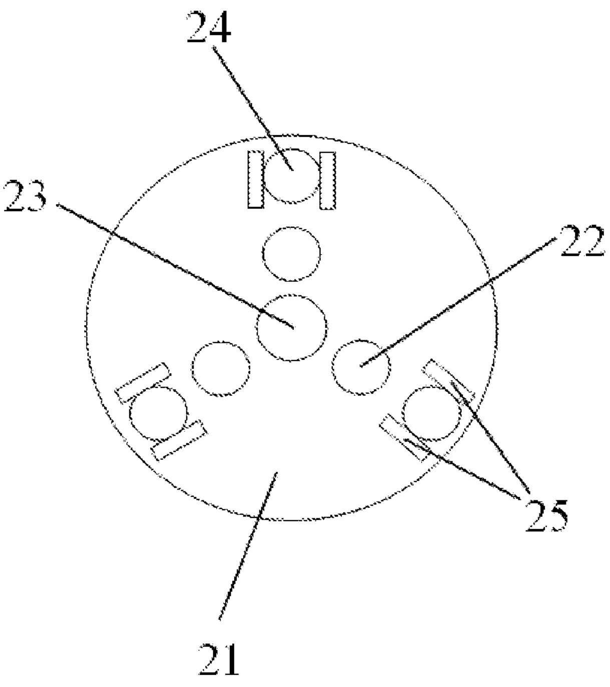
FIG. 3A illustrates a front view of the third plane of bottom plate.

FIG. 1 illustrates a perspective view of an embodiment of a specimen base. The specimen base is used for mounting a sample and is designed for remounting optical components with high repeatability and high precision. In this embodiment, the specimen base comprises a top plate 1 and a bottom plate 2 that are detachably coupled together. The top plate 1 comprises a first plane 11 and a second plane 12 opposite each other as shown in FIG. 2. The first plane 11 is used for fixing a specimen, specially a biological specimen, and the second plane 12 is coupled with a third plane 21 of the bottom plate 2. A top plate fixing part 13 is provided on the second plane 12 and a bottom plate fixing part 22 is provided at the corresponding position on the third plane 21 to couple the top plate 1 with the bottom plate 2 by means of matching the top plate fixing part 13 with the bottom plate fixing part 22, as shown in FIG. 2 to 3A. A through-hole 23 is provided in the bottom plate 2 as shown in FIG. 3 to fix the bottom plate 2 on other device as required.

As shown, in some embodiments, the top plate 1 and the bottom plate 2 are pie-shaped cubes. The shape of their cross-section may be set as required, such as rectangle, circle or triangle. And the top plate fixing part 13 and the bottom plate fixing part 22 may be made of magnetic material. They may be ring-shaped magnet or several magnetic cylinders embedded in the second plane 12 and the third plane 21 as required, for example, embedding one ring-shaped magnet in each plane, or embedding same amount of magnetic cylinders in each plane, or embedding one ring-shaped magnet in one plane and several magnetic cylinders in the other plane.

In some embodiments, when the top plate 1 and the bottom plate 2 are coupled together through magnetic force, an ON/OFF switch bar is set on the side wall of the top plate 1 which interrupts the magnetic force coupling the top plate 1 with the bottom plate 2, so as to the top plate 1 can be easily removed from the bottom plate 2 by pushing the ON/OFF switch bar.

The top plate 1 and the bottom plate 2 may also be coupled together in other ways, and the embodiments of the present invention do not specifically limit this.

Figure 2A:
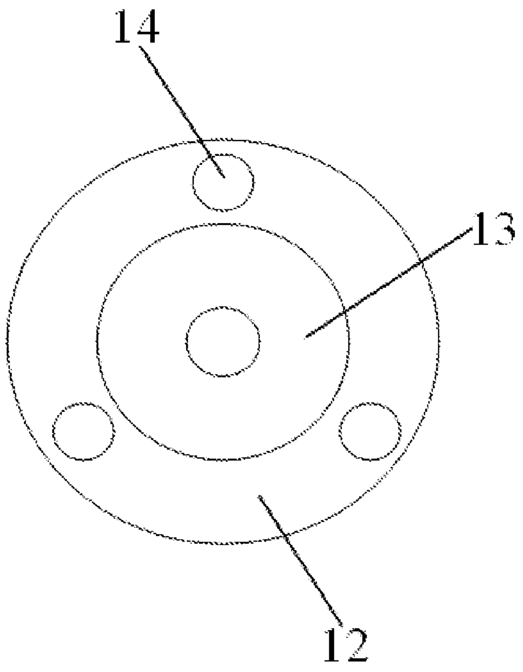
FIG. 2A illustrates a front view of the second plane of top plate.

Referring again to the embodiment shown in FIGS. 2A and 3A, a positioning part 14 is provided on the second plane 12, and a positioning slot 24 is provided at the corresponding position on the third plane 21, and matches with the positioning part 14. By matching the positioning part 14 with the positioning slot 24, the top plate 1 and the bottom plate 2 can be aligned quickly and accurately when attaching the top plate 1 to the bottom plate 2.

As shown, in some embodiments, the positioning part 14 is a ball embedding in the second plane 12 and part of the ball protrudes from the first plane 11. Meanwhile, two rods 25 are provided in the positioning slot 24 to form a space to accommodate the part of ball protruding from the first plane 1. The ball and the rod 25 may be magnetic, therefore they can quickly align and match together. The amount of the ball, size of the ball and how to arrange the ball on the second plate 12 can be set as required. The embodiments of the present invention do not specifically limit this.

The positioning part 14 and the positioning slot 24 may also be matched in other ways, and the embodiments of the present invention do not specifically limit this.

As shown in FIGS. 2A and 3A, a ring-shaped magnet as the top plate fixing part 13, is embedded in the second plane 12, and three magnetic balls as the positioning part 14, are evenly arranged on a larger circumference of the second plane 12. And three magnetic cylinders, as the bottom plate fixing part 22 and three positioning slots 24 each with magnetic rods 25 are provide on the third plane 21 and arranged accordingly. In some cases, the positioning part 14 and the positioning slot 24 are respectively arranged on the second plane 12 and the third plane 21 in a specific way, so that the top plate 1 and the bottom plate 2 can be coupled together only in one relative position. This setting plays a role of error-proof.

In order to determine the relative position of the top plate 1 and the bottom plate 2, a mark line 8 may also be set on side wall of both the top plate 1 and the bottom plate 2. When the top plate 1 is separated from the bottom plate 2 and coupled with the bottom plate 2 again, by checking whether the mark line 8 on side wall of the top plate 1 and the bottom plate 2 is aligned, it can be confirmed that whether the top plate 1 and the bottom plate 2 are kept at the same relative position as it before the top plate 1 is separated from the bottom plate 2.

Figure 4:
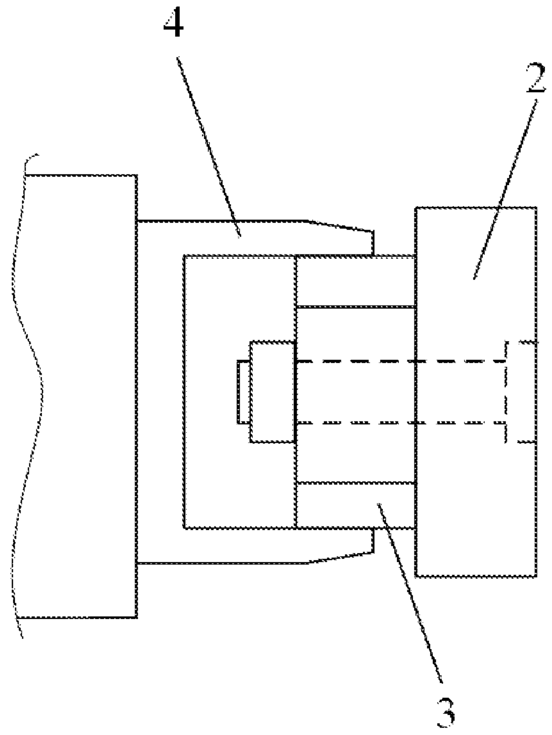
FIG. 4 illustrates a side view of an embodiment of specimen sectioning device.
Figure 5:
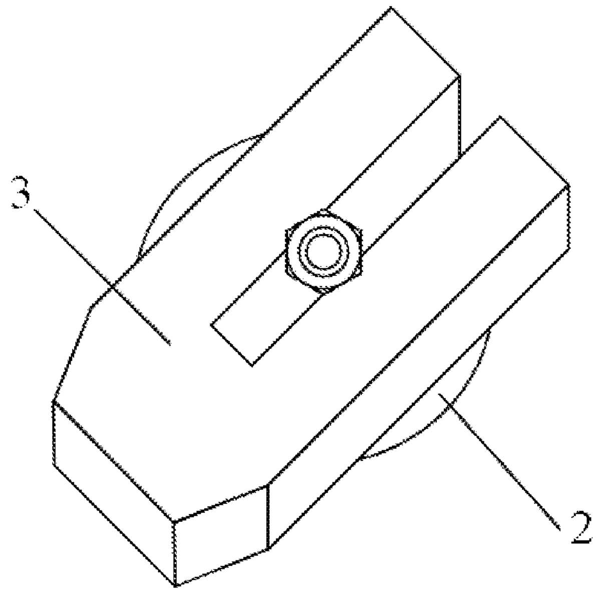
FIG. 5 illustrates a side view of assembly of bottom plane and mounting base.
Figure 5A:
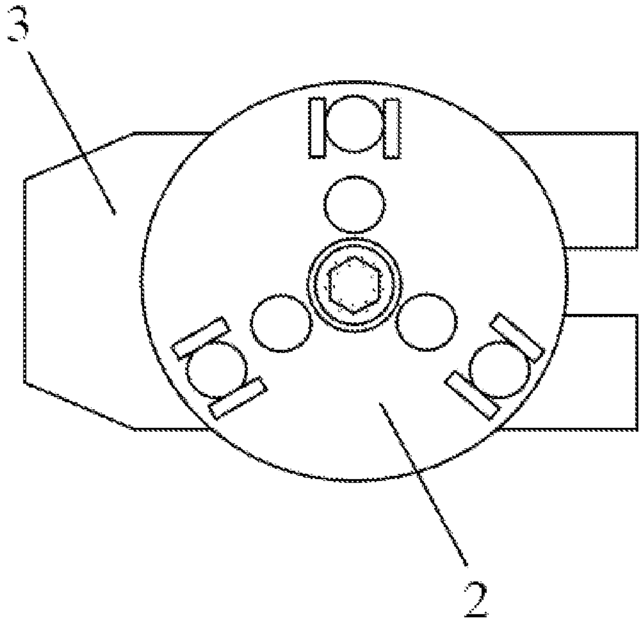
FIG. 5A illustrates a front view of the assembly of bottom plane and mounting base in FIG. 5.

FIG. 4 illustrates a side view of an embodiment of a specimen sectioning device. In this embodiment, the specimen sectioning device comprises a microtome and a bottom plate 2. As shown in FIGS. 5 and 5A, the bottom plate 2 is fixed on a mounting base 3, and the third plane 21 faces outside for accepting the top plate 1. And the mounting base 3 is tightly clamped onto a specimen clamp 4 of the microtome. Any type of microtome is suitable for this embodiment, such as Sakura ACCU-CUT SRM or Leica 2050. When the top plate 1 is coupled with the bottom plate 2 that is fixed on the microtome here, the biological specimen attaching on the first plane 11 can be sectioned by the microtome, such as 5 μm/cut to expose top surface of the specimen.

In the embodiment, as shown in FIGS. 4 to 5A, the mounting base 3 is a U-shaped bracket, and a bolt is put through the bottom plate 2 by a through-hole 23 and the U-shaped bracket, and screws them together tightly by a nut. Then the U-shaped bracket is placed onto the specimen clamp 4 of the microtome and tightly clamped by the specimen clamp 4.

The bottom plate 2 and the U-shaped bracket may also be fixed together in other ways, and the mounting base 3 may also be other structure. The embodiments of the present invention do not specifically limit this.

Figure 6:
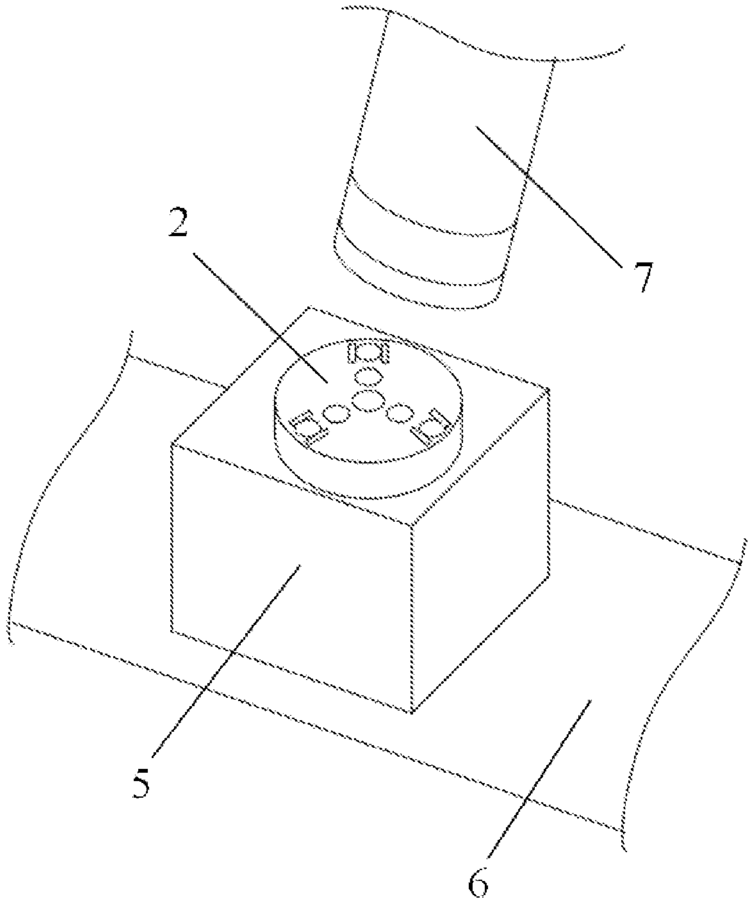
FIG. 6 illustrates a perspective view of an embodiment of a microscopic apparatus.

FIG. 6 illustrates a perspective view of an embodiment of a microscopic apparatus. In this embodiment, the microscopic apparatus comprises a microscope 7, and a bottom plate 2 is provided on a sample platform 6 of the microscope 7, with the third plane 21 facing upside. The top plate 1 with specimen on its first plane 11 can couple with the bottom plane 2 here and the cross-section of the specimen will be observed by the microscope 7.

In one embodiment, as shown in FIG. 6, a angle adjusting stage 5 may be provided between the sample platform 6 and the bottom plate 2 to adjust angle of the bottom plane 2 relative to the microscope lens around two axis (X, Y) to get better observation angle of the cross-section of the specimen. The bottom plate 2, may be secured with a screw onto the angle adjusting stage 5 and the angle adjusting stage 5 may be screwed onto the sample platform 6. The embodiments of the present invention do not specifically limit this.

Figure 7:
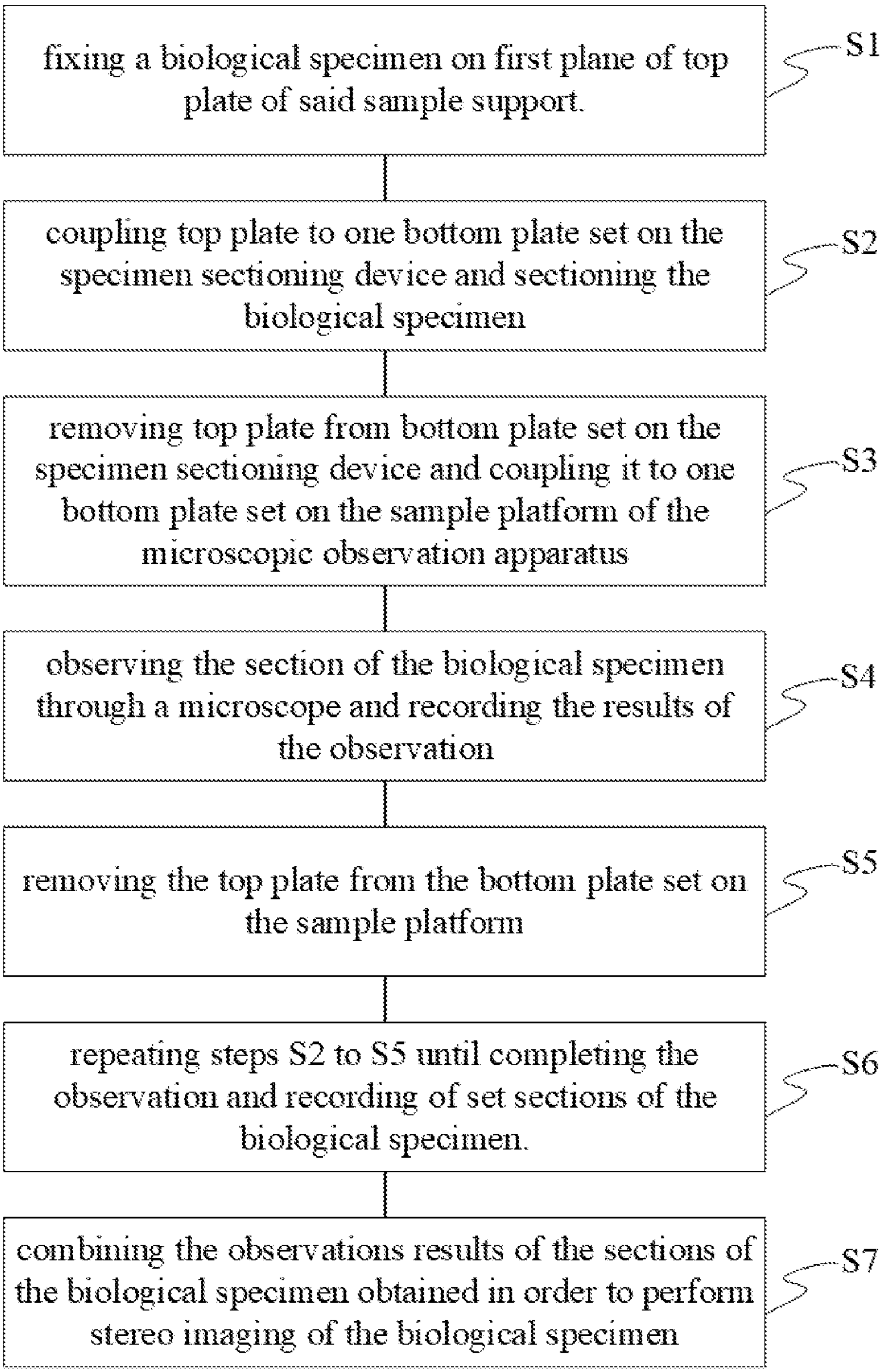
FIG. 7 illustrates shows a flowchart of a method for 3D imaging of biological specimen.

FIG. 7 illustrates a method for 3D imaging of biological specimen using the top plate 1, the specimen sectioning device and the microscopic apparatus mentioned above. The method comprises following steps.

S1. fixing a biological specimen on the first plane 11 of the top plate 1 of the specimen base.

The biological specimen may be glued on the first plane 11 of the top plate 1, for example, with two-component 5-min cure epoxy glue.

S2. coupling the top plate 1 with the bottom plate 2 provided on the specimen sectioning device and sectioning the biological specimen.

The bottom plate 2 is fixed on the mounting base 3 and then the mounting base 3 is tightly clamped onto the specimen clamp 4 of the microtome. The third plane 21 of the bottom plate 2 faces outside to couple with the second plane 12. After the top plate 1 with the biological specimen is mounted on the microtome, the biological specimen is sectioned.

S3. removing the top plate 1 from the bottom plate 2 provided on the specimen sectioning device and coupling it with the bottom plate 2 provided on the sample platform 6 of the microscope 7.

The bottom plate 2 is fixed on the sample platform 4 of the microscope 7, for example, by screwing or clamping structure and the third plane 21 faces upside. After removed from the bottom plate 2 fixed on the microtome, the top plate 1 with the biological specimen is moved to microscope 7 and coupled with the bottom plate 2 fixed on the sample platform 6 of the microscope 7.

With the fixing parts, the positioning part and the positioning slot provided on the second plane 12 of the top plate 1 and the third plane 21 of the bottom plate 2, the top plate 1 can be quickly transferred between the bottom plate 2 on the microtome and the bottom plate 2 on the sample platform 6, and can be kept at the same position under the microscope.

In one embodiment, before step S3, the angle adjusting stage 5 is provided between the sample platform 6 and the bottom plate 2 provided on the sample platform 6, so as to realize the adjustment of the angle of the section of the specimen fixed on the top base 1. The angle adjusting stage 5 may be connected with the sample platform 6 and bottom plate 2, for example, by screwing or clamping structure. The embodiments of the present invention do not specifically limit this.

S4. observing the section of the biological specimen through the microscope 7 and recording the results of the observation.

In one embodiment, before the observation, the angle of the specimen base relative to the sample platform 6 can be adjusted by the angle adjusting stage 5 as needed.

S5. removing the top plate 1 from the bottom plate 2 provided on the sample platform 6.

S6. repeating steps S2 to S5 until completing the observation and recording of set sections of the biological specimen.

S7. combining the observations results of the sections of the biological specimen obtained and performing 3D imaging of the biological specimen.

In one embodiment, 3D imaging of single sensory neuron axons within adult mouse forepaw or spinal cord is performed. The single sensory neuron axons within adult mouse forepaw or spinal cord is treated with the Transparent Embedding Solvent System (TESOS) clearing method, and a technical pipeline is built to image, reconstruct and analyze sensory neuron axons projections at sub-micron resolution. UV light-initiated polymerization reactions transform cleared tissue together with the clearing solution into transparent organogel, a process named transparent embedding. After the treatment, the samples remains fully transparent with unchanged endogenous fluorescence and the mechanical strength is enhanced by >150 folds.

The embedded sample (single sensory neuron axons within adult mouse forepaw or spinal cord) is glued onto the first plane 11 of the top plate 1 of the specimen base with two-component 5-min cure epoxy glue, such as Gorilla, Home Depot.

The top plate 1 with the embedded sample is mounted on the microtome and the embedded sample is sectioned (5 μm/cut) to expose the sample top surface. After sectioning, the top surface is dropped with BB-BED medium and covered with a glass coverslip. Then the sample is next cured with a UV lamp, for example Thorlabs CS20K2, for five seconds to polymerize the newly added medium and to secure the coverslip.

Then the top plate 1 with the embedded sample is removed from the microtome and coupled with the bottom plate 2 fixed on the microscope. The embedded sample can be imaged with an upright confocal/2-photon microscopy as a regular slide. For immersion objectives, immersion oil could be dropped directly onto the coverslip. Oil immersion objectives are highly recommended due to the high R.I. (1.55-1.56) of the BB-BED medium and gel. The imaging depth of each imaging Z-stack is determined by the objectives and imaging requirements. The top plane of the Z stack should be at least 10 μm below the sample sectioning surface to avoid any potential distortion on the machined surface.

After imaging the selected sample areas, the coverslip is removed by sliding it off the surface. The sample is transferred to the microtome for sectioning (5 μm/cut). The sectioning depth should be at least 10% less than the Z-stack depth to provide overlapping area for stacks stitching. Sectioned sample is repositioned onto the bottom plate 2 on sample platform 6 and dropped with BB-BED medium followed by coverslip placement and UV curing for the next imaging cycle.

Such imaging-sectioning cycles are repeated until the region of interest (ROI) is completely imaged.

For very large samples, for example mouse pup whole body and adult mouse body trunk, the sample need to be milled. The milling treatment of the sample is processed with a milling motor setup built on an upright microscope, for example, Leica Sp8 confocal microscope. A high precision linear guide (IKO LWLF 42B) is installed on the sample platform 6 (Scientifica Inc. MMBP). One end of the linear guide is under the objective and the other end is under the milling platform. Under the objective, the specimen base (SB1/M, Thorlabs) is connected with the sliding block (IKO LWLFF 42BCS) on the linear guide through a vertical translational stage (Thorlabs MVS 005). The vertical stage is equipped with a fine-adjustment micrometer (Thorlabs 148-811ST). The milling platform is installed on the left side of the microscope and is composed of a water-cooled spindle motor installed on a vertical translational stage (Thorlabs VAP 10/M).

The transparent embedded sample is glued onto top plate 1 of the specimen base and locked onto top plate 1 under the objective. The sample is first moved along the linear guide to under the milling motor. Sample surface is milled off with a 2 mm end-cutting milling bur. The sample movement under the motor is controlled by the sample platform 6. The cutting depth is controlled by adjusting the vertical stage position with the micrometer. The debris is blown off and a drop of BB-BED medium is placed onto the milling surface and a coverslip is placed. After curing the newly added medium with a UV light, the sample is moved back to the objective along the linear guide. Mechanical stops is installed on the linear guide to ensure repeatable reposition. The top plane of the Z stack should be at least 25 μm below the milling surface due to the relatively higher roughness from the milling process.

No alignment is needed for the milling setup since the milling X-Y movement during the milling is controlled by the sample platform, so that the milling surface is already in line with the imaging plane.

Linear channel unmixing is used for reducing autofluorescence. For tissues with strong autofluorescence including skin, skeletal muscles and bones etc. linear channel unmixing is performed to distinguish true fluorescent signal from tissue autofluorescence. Autofluorescence signal widely spreads from 350 nm to 600 nm (Zipfel et al., 2003), whereas fluorescence from protein or antibody conjugation is very restricted. Depending on the endogenous fluorescence spectrum, the autofluorescence detection channel is setup at either 488 nm or 568 nm wavelength. The imaging parameters for autofluorescence detection channel were carefully adjusted so that little true fluorescence signal is detected.

The channel unmixing operation is performed with the "image calculator" function in the Image J (NIH Image J). The autofluorescence signal is subtracted from the true signal channel to generate a new channel and the new channel is combined with the previous autofluorescence channel to generate the final images. Autofluorescence signal is used for outlining tissues.

Regarding image deconvolution and stitching, image deconvolution is accomplished with the "microconvolution" module within the Slidebook 6.0 software (3I inc.). The iteration number is set as 10. Regularization is set as "none". Blind deconvolution is checked. PSF model is automatically generated based on the optical parameter being provided.

BigStitcher module within the Image J is used for stitching imaging tiles. 10% overlapping is set up for adjacent tiles. Image stacks are exported as image sequence of .tif format. Image stacks before and after samples sectioning/milling were sequentially stitched based on the overlapping regions. For two consecutive stacks, to facilitate speed, only images sequence in the overlapping zone were selected. Pairwise stitching module of the Image J is run to stitch these selected images together. The other image sequences in the two stacks were modified their metadata (custom Image J macro code).

Regarding image reconstruction and axon tracing, for 3D rendering, image sequences were converted into .IMS format (Imaris Converter, Bitplane). 3-D rendering, snapshots and animation were performed with Imaris (Bitplane). Multiresolution pyramid is generated from stitched image sequences for 3-D tracing (TeraConverter, Bria et al. 2016). Manual tracing of axons is performed by a team of two annotators using TeraFly in Vaa3D (Peng et al., 2014; Peng et al., 2010). For registration, spinal cord image stacks were resliced for planes orthogonal to the rostrocaudal axis of the spinal cord. The resliced imaging plane is aligned and annotated based on the spatial map for the Allen Mouse Spinal Cord Atlases (the Allen Institute).

To reduce the final data size for axon tracing, the stitched imaging data is separated into three parts: 1. nerve ending in paw; 2. nerve bundle in the arm; 3. DRG and projection within the spinal cord. An overlap of 40 slices is retained in each part for the determination of axon positions. For the first part, manual 3D tracing of axons is performed with TeraFly in Vaa3d. For the second part, tracing of single axon is performed manually using stitched 2D slices in Image J. Target axon from the first part is shown in "Section" mode in Vaa3D in order to display its localization in 2D slices, and to find its counterpart in the second part. Finally, axon tracing into the DRG and its projection within the spinal cord is done manually with Terafly in Vaa3D. Each tracing procedure is performed by a team of two annotators.

Regarding quantification and statistical analysis, N number are reported in figures and legends. Data are presented as mean±standard deviation using one-way ANOVA or Student's t tests. Statistical analysis is performed in GraphPad Prism and Microsoft Excel.

With the specimen base, the specimen sectioning device and the microscopic apparatus, we can achieve sub-micron resolution in large samples composed of various tissue types and obtain 3D imaging of biological specimen quickly.

In the present invention, terms such as "up", "down", "left", "right", "front", "back", "vertical", "horizontal", "side", "front", "back", "vertical", "horizontal", "side", "bottom" and the like indicate the orientation or position relationship based on the orientation or position relationship shown in the accompanying drawings, and are only relationship words determined for the purpose of facilitating the description of the structural relationship of the parts or components of the present invention, and do not refer specifically to any part or component of the present invention, and are not to be construed as a limitation of the present invention.

In the description of the present invention, it should be noted that, unless otherwise expressly specified and limited, the terms "mounted", "connected", "connected" are to be understood in a broad sense, for example, they can be For example, it can be a fixed connection, a removable connection, or a one-piece connection; it can be a mechanical connection or an electrical connection; it can be a direct connection or an indirect connection through an intermediate medium, and it can be a connection within two components. For a person of ordinary skill in the art, the specific meaning of the above terms in the context of the present invention can be understood on a case-by-case basis and cannot be construed as a limitation of the invention.

It is to be noted that the terms used herein are intended to describe specific embodiments only and are not intended to limit the exemplary embodiments according to the present application. As used herein, unless the context clearly indicates otherwise, the singular form is also intended to comprise the plural form, and it is also to be understood that when the terms "comprising" and/or "including" are used in this specification, they indicate the presence of features, steps, operations, devices, assemblies, and/or components, operations, devices, components, and/or combinations thereof.

The foregoing embodiments are intended to illustrate the invention only and are not limitations of the invention. Despite the detailed description of the present invention with reference to the embodiments, it should be understood by those of ordinary skill in the art that various combinations, modifications or equivalent substitutions of the technical solutions of the present invention do not depart from the spirit and scope of the technical solutions of the present invention and should be covered by the scope of the claims of the present invention.

The invention claimed is:

1. A specimen sectioning device, comprising a microtome and one bottom plate (2), the bottom plate (2) is fixed on a mounting base (3), and the mounting base (3) is fixed on a specimen clamp (4) of the microtome, wherein the bottom plate (2) is configured to detachably couple with a top plate (1), wherein the top plate (1) comprises a first plane (11) and a second plane (12) opposite each other, the first plane (11) is used for fixing specimen, and the second plane (12) is coupled with a third plane (21) of the bottom plate (2);

wherein a top plate fixing part (13) is provided on the second plane (12) and a bottom plate fixing part (22) is provided at the corresponding position on the third plane (21); the top plate (1) couples with the bottom plate (2) by means of matching the top plate fixing part (13) with the bottom plate fixing part (22); and wherein a through-hole (23) is provided in the bottom plate (2).

2. A method for 3D imaging of biological specimen, using a top plate (1), a specimen sectioning device and a microscopic apparatus, wherein the specimen sectioning device comprises a microtome and one bottom plate (2) fixed on a mounting base (3), the mounting base (3) is fixed on a specimen clamp (4) of the microtome;

wherein the microscopic apparatus comprises a microscope (7) and one bottom plate (2) provided on a sample platform (6) of the microscope (7);

wherein each of the bottom plate (2) fixed on the mounting base (3) and the bottom plate (2) provided on the sample platform (6) is configured to detachably couple with the top plate (1), the top plate (1) comprises a first plane (11) and a second plane (12) opposite each other, the first plane (11) is used for fixing specimen, and the second plane (12) is coupled with a third plane (21) of the respective bottom plate (2);

wherein a top plate fixing part (13) is provided on the second plane (12) and a bottom plate fixing part (22) is provided at the corresponding position on the third plane (21); each the bottom plate (2) couples with the top plate (1) by means of matching the top plate fixing part (13) with the bottom plate fixing part (22);

wherein a through-hole (23) is provided in each bottom plate (2);

wherein the method comprises the following steps:

S1) fixing a biological specimen on the first plane (11) of the top plate (1);

S2) coupling the top plate (1) to the bottom plate (2) provided on the specimen sectioning device and sectioning the biological specimen;

S3) removing the top plate (1) from the bottom plate (2) provided on the specimen sectioning device and coupling it with the bottom plate (2) provided on the sample platform (6) of the microscope (7);

S4) observing the section of the biological specimen through the microscope (7) and recording the results of the observation;

S5) removing the top plate (1) from the bottom plate (2) provided on the sample platform (6);

S6) repeating steps S2) to S5) until completing the observation and recording of set sections of the biological specimen;

S7) combining the observations results of the sections of the biological specimen obtained and performing 3D imaging of the biological specimen.

3. The method for 3D imaging of biological specimen of claim 2, wherein before step S3), an angle adjusting stage (5) is provided between the sample platform (6) and the bottom plate (2) provided on the sample platform (6).

4. The method for 3D imaging of biological specimen of claim 2, wherein before step S4), an angle of the specimen base relative to the sample platform (6) is adjusted by the angle adjustment stage (5).

5. The method for 3D imaging of biological specimen of claim 2, wherein an angle adjusting stage (5) is provided between the sample platform (6) and the bottom plate (2) to adjust angle of the bottom plane (2).

* * * * *